United States Patent
Wang

(10) Patent No.: US 7,843,656 B2
(45) Date of Patent: Nov. 30, 2010

(54) LENS ACTUATOR

(75) Inventor: Yu-Bin Wang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 12/503,670

(22) Filed: Jul. 15, 2009

(65) Prior Publication Data

US 2010/0128372 A1    May 27, 2010

(51) Int. Cl.
*G02B 7/02* (2006.01)

(52) U.S. Cl. .................................. 359/819; 359/824
(58) Field of Classification Search ................ 359/819, 359/824
See application file for complete search history.

(56) References Cited

U.S. PATENT DOCUMENTS

2009/0268311 A1* 10/2009 Ke ............................ 359/704

* cited by examiner

*Primary Examiner*—Ricky L Mack
*Assistant Examiner*—James C Jones
(74) *Attorney, Agent, or Firm*—Raymond J. Chew

(57) ABSTRACT

An exemplary lens actuator includes a lens barrel, a plurality of convex stages and a plurality of stop mechanisms protruding out from a first end surface of the lens barrel, a coil wrapped around the lens barrel, a plurality of magnets, a bracket, and a resilient plate. The resilient plate includes an outer frame, an inner frame substantially coaxial with the outer frame, and a plurality of spring portions interconnected between the outer frame and the inner frame. The outer frame of the resilient plate is fixed on the first side of the bracket. The inner frame of the resilient plate is fixed on the plurality of convex stages. The plurality of stop mechanisms faces a surface of the outer frame and is configured for limiting a maximum travel of the lens barrel.

6 Claims, 3 Drawing Sheets

LENS ACTUATOR

CROSS REFERENCE TO RELATED APPLICATIONS

This application is related to commonly-assigned copending application Ser. No. 12/192,376, entitled "RESILIENT PLATE AND LENS ACTUATOR WITH SAME", and Ser. No. 12/327,658, entitled "RESILIENT PLATE FOR LENS ACTUATOR". Disclosures of the above-identified applications are incorporated herein by reference in its entirety.

BACKGROUND

1. Technical Field

The present disclosure relates to lens actuators, and particularly, to a voice coil motor type lens actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without change of lenses.

Generally, the optical system usually includes an actuator, such as a step motor, to drive the lenses. However, the step motor is relatively large in volume. Use of the step motor requires a significant amount of space for movement of the lenses, which makes the optical system bulky.

Therefore, a lens actuator is desirable to overcome the above-described deficiencies.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
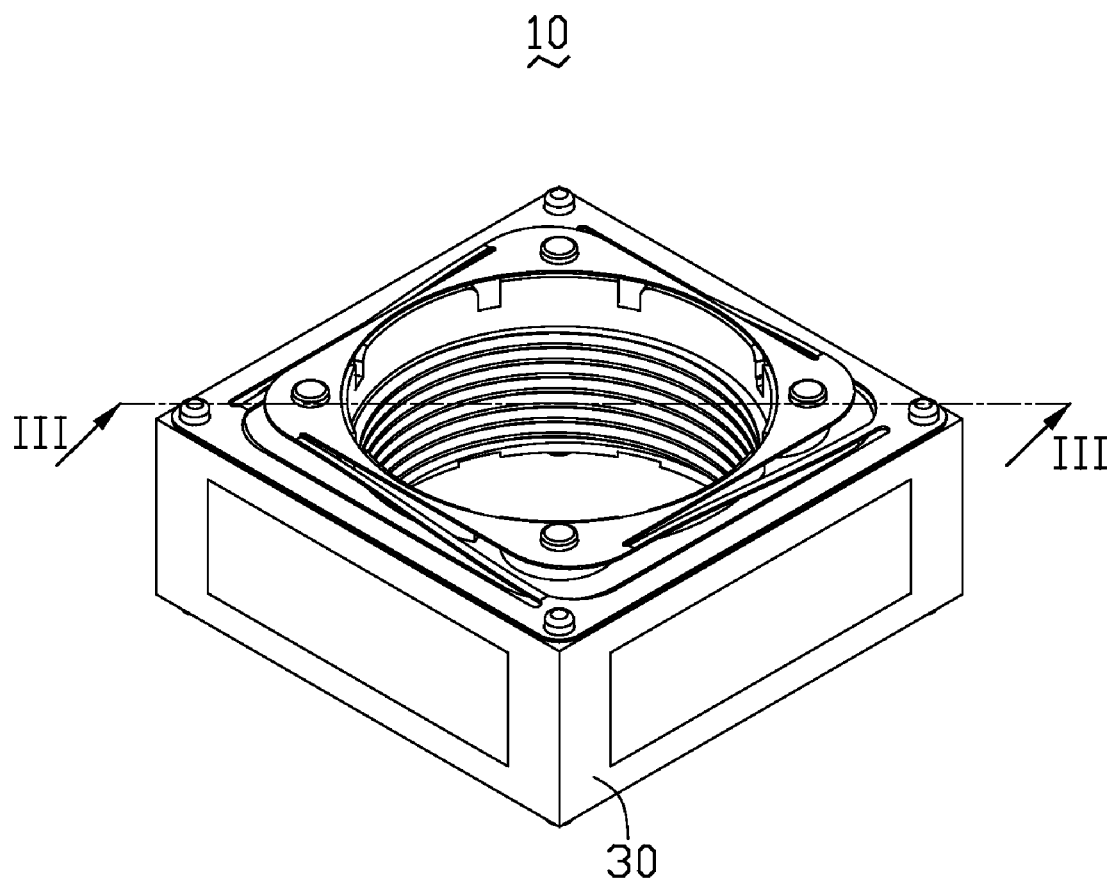
FIG. 1 is a schematic, isometric view of a lens actuator according to an exemplary embodiment.
Figure 2:
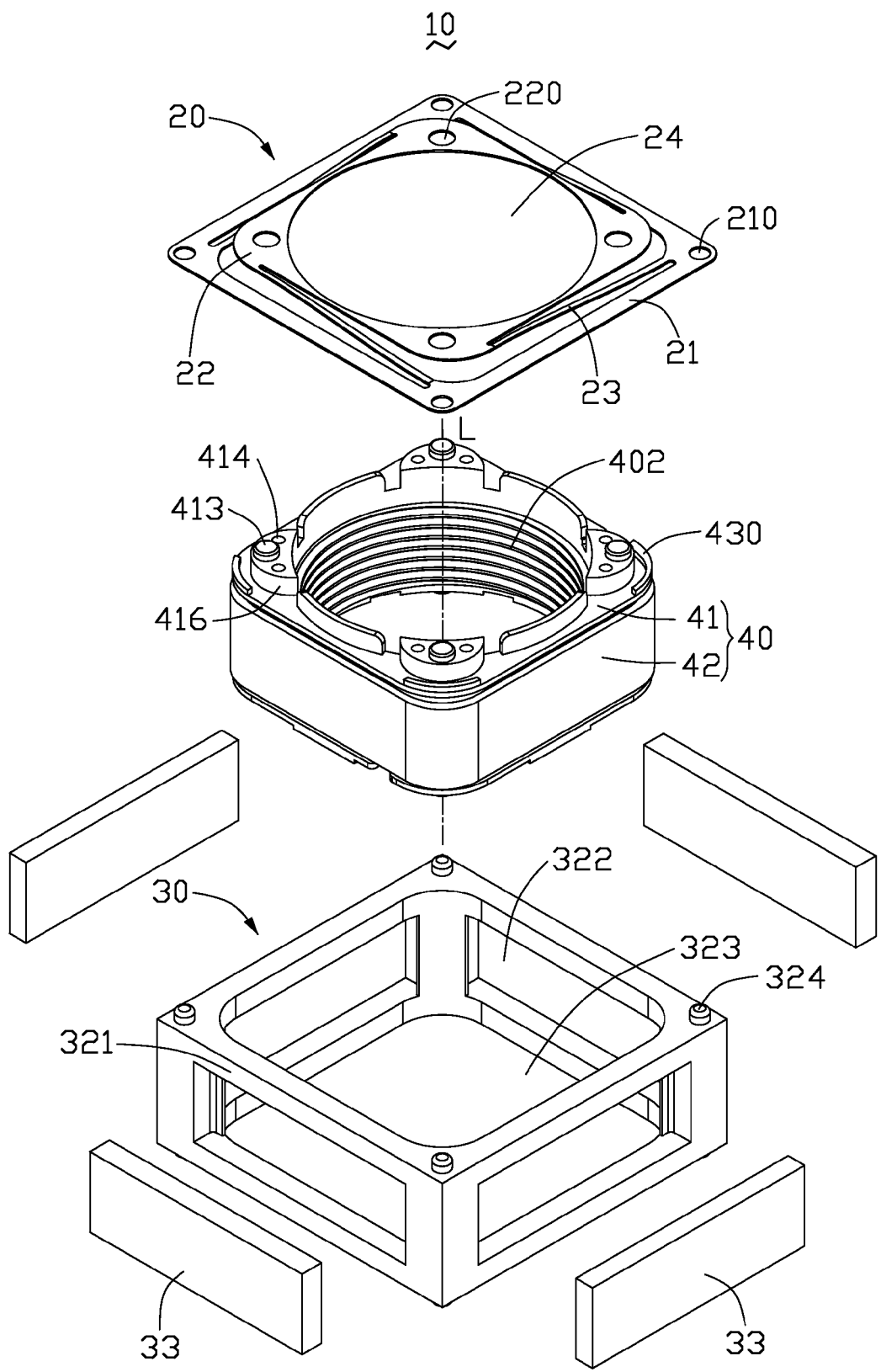
FIG. 2 is an exploded view of the lens actuator of FIG. 1.
Figure 3:
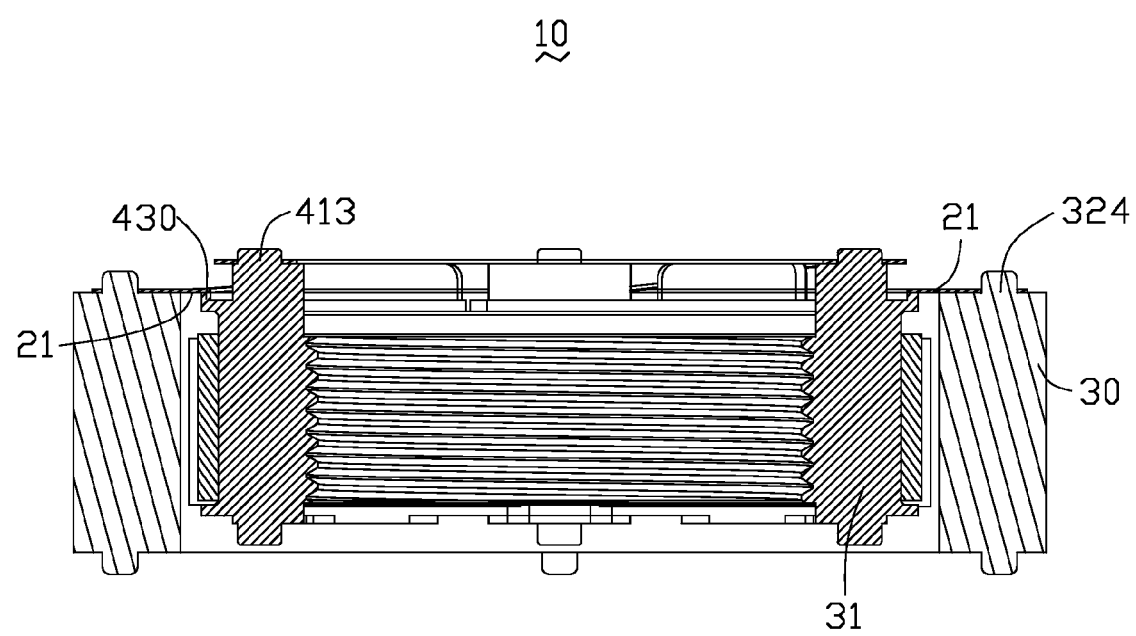
FIG. 3 is a cross-sectional view taken along line III-III of FIG. 1.

Referring to FIGS. 1 to 3, a lens actuator 10, in accordance with an exemplary embodiment, includes at least one resilient plate 20, a fixed unit 30, and a movable unit 40.

The fixed unit 30 includes a frame body 321. A first accommodation room 323 is defined in the frame body 321. Four magnet mounting holes 322 are respectively defined in four sides of the frame body 321. The magnet mounting holes 322 are in communication with the first accommodation room 323. Four first locating pins 324 are vertically protruding out from the top side of the frame body 321 at each corner thereof. The first locating pins 324 are configured for fastening the top side of the frame body 321 to the resilient plate 20. The magnet mounting holes 322 are configured for holding magnets (not shown).

The movable unit 40 includes a lens barrel 41 and coils 42. The coils 42 are wrapped around the side wall of the lens barrel 41. The movable unit 40 is accommodated in the first accommodating room 323 of the fixed unit 30. The lens barrel 41 defines a second accommodating room 402 for accommodating the lenses and filters (not shown). The second accommodating room 402 is a through hole. Four convex stages 416 protrude out from the top side of the lens barrel 41 at each corner thereof. A second locating pin 413 protrudes out from the top surface of each convex stage 416. Two holes 414 are defined on the top surface of each convex stage 416. The holes 414 are configured for receiving adhesive materials therein. The movable unit 40 further includes at least two stop blocks 430 protruding out from the top side of the lens barrel 41 at each corner thereof. The stop blocks 430 are configured for limiting the maximum upward travel of the lens barrel 41. In the exemplary embodiment, four stop blocks 430 are uniformly arranged at each corner of the top side of the lens barrel 41. The stop blocks 430 are located far away from the central axis L of the lens barrel 41 than the convex stages 416. In the exemplary embodiment, the stop blocks 430 are arc shaped. In alternative embodiments, the stop blocks 430 can also be cylindrical, square etc. The heights of the convex stages 416 are greater than that of the stop blocks 430.

The resilient plate 20 includes an outer frame 21, an inner frame 22 coaxial with the outer frame 21, and a plurality of spring portions 23 interconnected between the outer frame 21 and the inner frame 22. In the exemplary embodiment, the resilient plate 20 is substantially square shaped. The resilient plate 20 can also be disk shaped in alternative embodiments. A through hole 24 for light passing therethrough is defined at the central portion of the inner frame 22. Four first pin holes 210 are defined at each corner of the outer frame 21 spatially corresponding to the first locating pins 324 on the top side of the frame body 321. Four second pin holes 220 are defined at each corner of the inner frame 22 spatially corresponding to the second locating pins 413.

The resilient plate 20 is fastened to the top side of the lens barrel 41 by engagement of the second locating pins 413 in the respective second pin holes 220. The inner frame 22 is glued (i.e., adhesively mounted) to the top surface of the convex stages 416, so as to prevent the lenses or the filters from falling out of the lens barrel 41. The resilient plate 20 is fastened to the top side of the frame body 321 by engagement of the first locating pins 324 in the respective first pin holes 210. The outer frame 21 can be glued (i.e., adhesively mounted) to the top surface of the frame body 321. The stop blocks 430 on the top side of the lens barrel 41 directly face the bottom surface of the outer frame 21.

When an electric current is applied to the coils 42, the coils 42 are excited to act upon the magnet 33, thereby producing a magnetic force to drive the lens barrel 41 to move upward or downward. When the lens barrel 41 moves to a position where the stop blocks 430 resist on the bottom surface of the outer frame 21, the lens barrel 41 stops moving. Accordingly, the difference in height between the convex stage 416 and the stop block 430 is equal to a maximum upward travel of the lens barrel 41. As a result, the stop blocks 430 limit the maximum upward travel of the lens barrel 41.

While certain embodiments have been described and exemplified above, various other embodiments will be apparent to those skilled in the art from the foregoing disclosure. The exemplary invention is not limited to the particular embodiments described and exemplified but is capable of considerable variation and modification without departure from the scope of the appended claims.

What is claimed is:

1. A lens actuator, comprising:
   a lens barrel having a first end surface and an opposite second end surface;

a plurality of convex stages and a plurality of stop blocks protruding out from the first end surface of the lens barrel, the height of each convex stage being greater than that of each stop block;

a coil wrapped around the lens barrel;

a plurality of magnets;

a bracket for mounting magnets thereon and accommodating the lens barrel therein, the bracket having a first side and an opposite second side; and a resilient plate comprising an outer frame, an inner frame substantially coaxial with the outer frame, and a plurality of spring portions interconnected between the outer frame and the inner frame, the outer frame having a first surface and an opposite second surface;

wherein the first surface of the outer frame of the resilient plate is fixed on the first side of the bracket, the inner frame of the resilient plate is fixed on the plurality of convex stages, the plurality of stop blocks faces the first surface of the outer frame and is configured for limiting a maximum travel of the lens barrel, and the difference in height between each convex stage and each stop block is equal to a maximum upward travel of the lens barrel.

2. The lens actuator of claim 1, wherein each of the stop blocks is arc shaped.

3. The lens actuator of claim 1, wherein a plurality of gluing holes are defined in the top surface of each convex stage configured for receiving an adhesive material therein.

4. The lens actuator of claim 1, wherein the inner frame comprises a plurality of first pin holes defined therein, and the outer frame comprises a plurality of second pin holes defined therein.

5. The lens actuator of claim 4, further comprising a first positioning pin spatially corresponding to a respective first pin hole and protruding out from the top surface of each convex stage, wherein the inner frame of the resilient plate is fastened to the lens barrel by engagement of the first positioning pins in the respective first pin holes.

6. The lens actuator of claim 5, further comprising a second positioning pin spatially corresponding to a respective second pin hole and protruding out from the first side of the bracket, wherein the outer frame of the resilient plate is fastened to the bracket by engagement of the second positioning pins in the respective second pin holes.

\* \* \* \* \*